United States Patent

Kuwamoto et al.

[11] Patent Number: 5,582,896
[45] Date of Patent: Dec. 10, 1996

[54] RECORDING AND REPRODUCING MEDIUM AND A RECORDING AND REPRODUCING APPARATUS

[75] Inventors: Makoto Kuwamoto, Hirakata; Hiroshi Kohso, Fujiidera; Tatsuhiko Inagaki, Takatsuki, all of Japan

[73] Assignee: Matsushita Electric Industrial Co., Ltd., Kadoma, Japan

[21] Appl. No.: 141,130

[22] Filed: Oct. 21, 1993

[30] Foreign Application Priority Data

Oct. 23, 1992 [JP] Japan .................................. 4-285757

[51] Int. Cl.$^6$ ........................................................ B32B 3/00
[52] U.S. Cl. ................... 428/141; 428/64.3; 428/64.4; 428/161; 428/163; 428/164; 428/167; 428/174; 428/332; 428/333; 428/457; 428/913; 369/275.2; 369/275.3; 369/275.4; 346/135.1; 430/945
[58] Field of Search ............................... 428/64, 141, 161, 428/163, 164, 167, 174, 332, 333, 411.1, 457, 913, 64.3, 64.4; 430/945; 369/275.2, 275.3, 275.4; 346/76 L, 135.1

[56] References Cited

U.S. PATENT DOCUMENTS

| | | | |
|---|---|---|---|
| 3,815,969 | 6/1974 | Fletcher et al. | 350/3.5 |
| 4,724,444 | 2/1988 | Pettigrew et al. | 346/1.1 |
| 4,786,585 | 11/1988 | Humberstone et al. | 430/495 |
| 4,893,299 | 1/1990 | Humberstone et al. | 369/275 |
| 5,014,254 | 5/1991 | Van Rosmallen et al. | 369/13 |
| 5,049,462 | 9/1991 | Funhoff et al. | 430/21 |

FOREIGN PATENT DOCUMENTS

| | | |
|---|---|---|
| 0107379 | 5/1984 | European Pat. Off. . |
| 0110729 | 6/1984 | European Pat. Off. . |
| 60-500148 | 1/1985 | Japan . |
| 2-308423 | 12/1990 | Japan . |
| 4-14620 | 1/1992 | Japan . |
| 4-062090 | 2/1992 | Japan . |
| 0462090 | 2/1992 | Japan . |
| 8402420 | 6/1984 | WIPO . |
| WO9106035 | 5/1991 | WIPO . |

Primary Examiner—Patrick J. Ryan
Assistant Examiner—Marie R. Yamnitzky
Attorney, Agent, or Firm—Renner, Otto, Boisselle & Sklar

[57] ABSTRACT

A recording and reproducing medium includes: at least one recording and reproducing layer; and a heating layer which receives light for writing data, converts a part of energy of the light into heat, and selectively heats a desired portion of the recording and reproducing layer, thereby changing optical characteristics of the desired portion, wherein the heating layer converts the part of energy of the light into the heat by a surface plasmon resonance phenomenon.

23 Claims, 2 Drawing Sheets

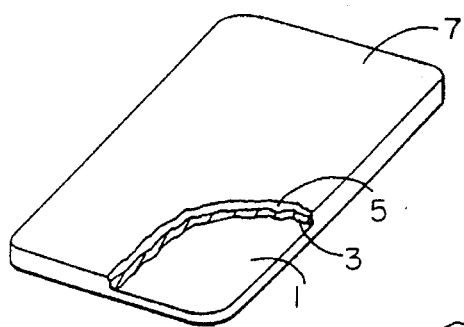
FIG. 1
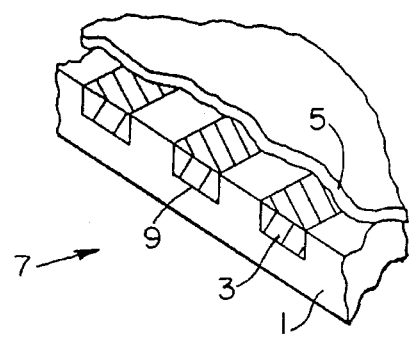
FIG. 2A
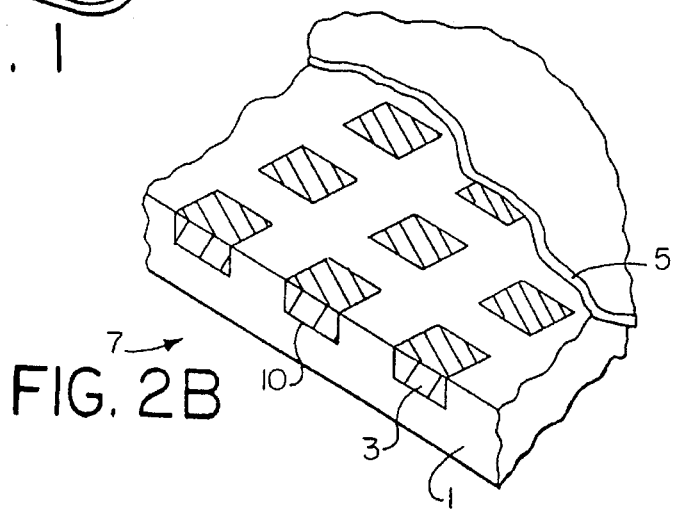
FIG. 2B
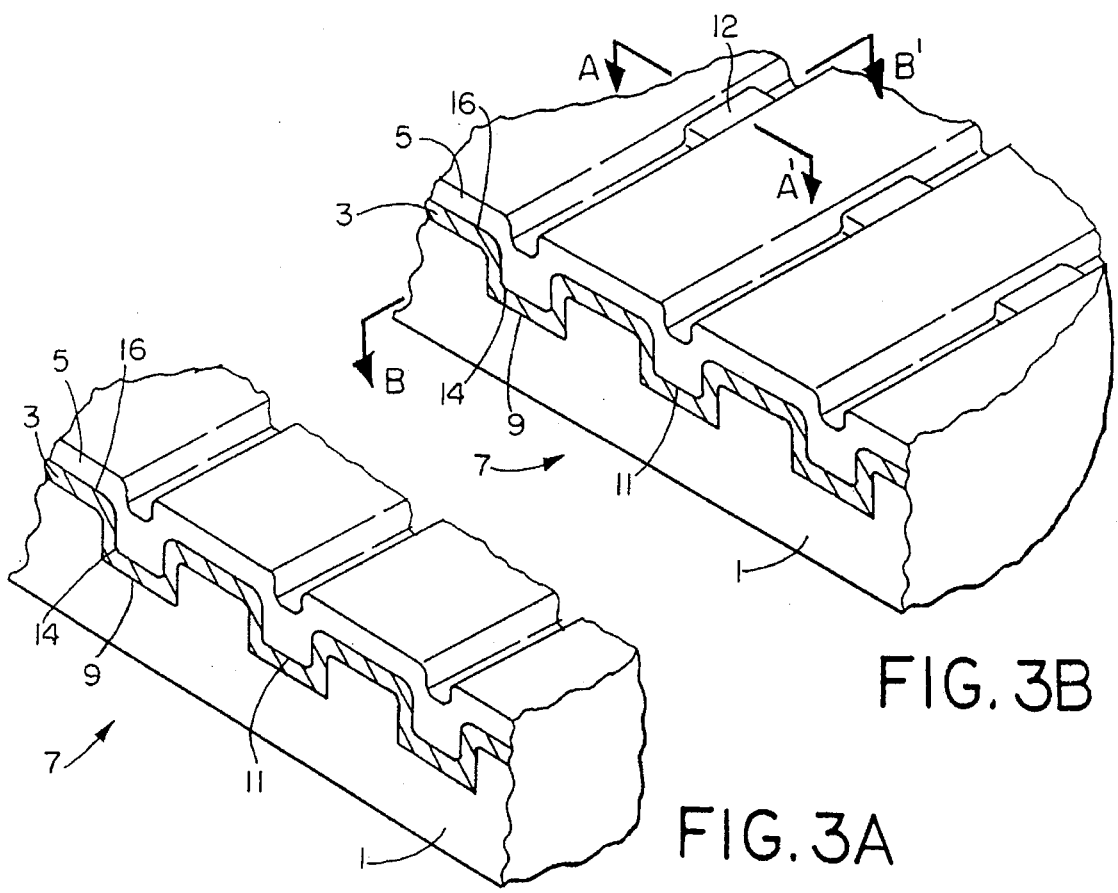
FIG. 3B
FIG. 3A

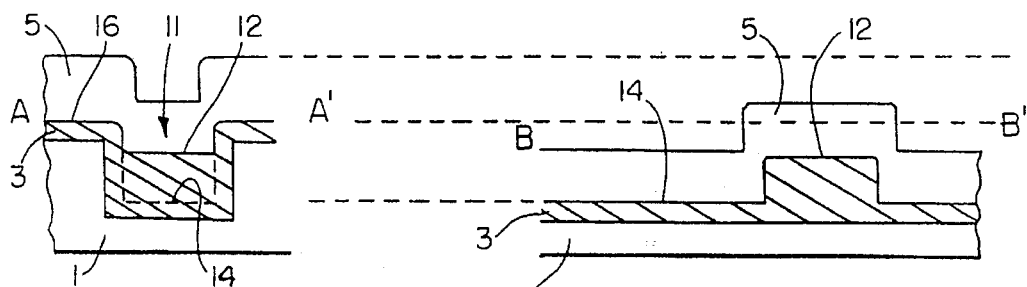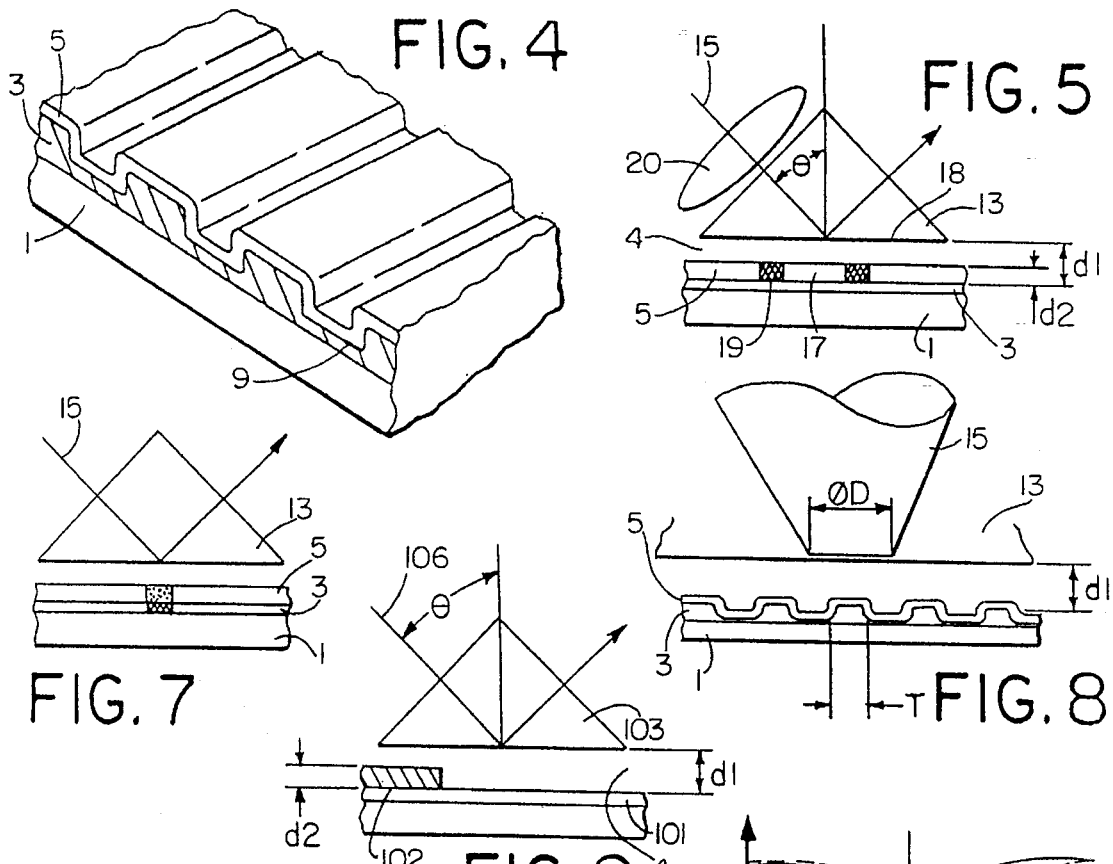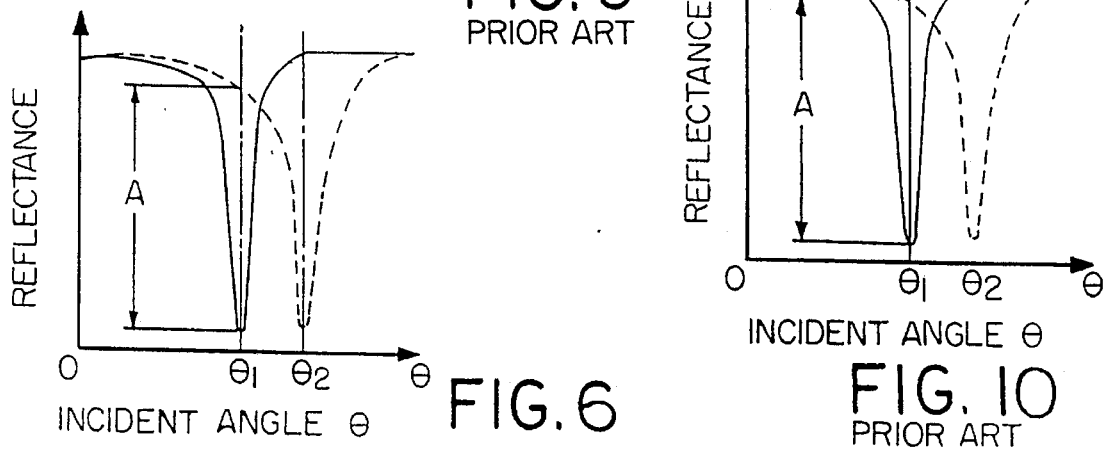

RECORDING AND REPRODUCING MEDIUM AND A RECORDING AND REPRODUCING APPARATUS

BACKGROUND OF THE INVENTION

1. Field of the Invention

The present invention relates to a recording and reproducing medium and to an apparatus for recording and reproducing data in the medium by using a laser beam.

2. Description of the Related Art

In general, optical disks (e.g., a compact disk) have been widely used for reproducing data in music or moving picture fields, because of the large capacity and low price thereof. The optical disks have also been used for peripheral equipment such as a computer, etc. In this field, it is required that the optical disks record and reproduce data. The optical disks generally use a thermal recording method. In this method, a laser beam for recording and reproducing data, emitted from a light source such as a laser device is condensed at a minute spot of a recording and reproducing medium. The optical characteristics of the minute spot region of the recording and reproducing medium are changed when being heated, whereby data is recorded therein. In such a thermal recording method, since the efficiency at which the energy of the laser beam is converted into heat is not high, high-speed recording and reproducing are difficult to perform, requiring the light source for a laser beam with a high output.

In recent years, in order to overcome the above-mentioned problem, a reproducing method using a surface plasmon resonance phenomenon is proposed in Japanese Laid-Open Patent Publication No. 4-14620. In this method, a recording layer can be made thin, so that data is recorded using a light source for a laser beam with a relatively low output.

Hereinafter, a conventional example of a recording and reproducing system aiming at high-speed recording will be described with reference to FIG. 9.

A medium 4 is filled between a prism 103 and a metal layer 101. The medium 4 has a refractive index ns which is smaller than the refractive index np of the prism 103 and has a thickness of d1. In general, the medium 4 should satisfy np>ns. The medium 4 is usually air (in this case, ns is about 1). As an incident light 106, a P-polarized light having a wavelength of $\lambda$ is incident upon the prism 103 at an incident angle $\theta$ larger than a critical angle $\theta c$. When the incident light 106 is incident upon the prism 103 at a particular angle $\theta 1$, an evanescent wave generated under an interface (i.e., the bottom face of the prism 103) is resonated with the vibration of plasma present between the medium 4 and the metal layer 101, thereby causing the surface plasmon resonance phenomenon. Because of this, the reflectance of the incident light 106 is reduced. In general, it is desired that the thickness d1 is smaller than a wavelength $\lambda$ of the incident light 106.

FIG. 10 is a graph showing the relationship between the reflectance of the incident light 106 and the incident angle $\theta$ thereof, where $\theta$ is a variable. A solid line shows the change in reflectance of the incident light 106 with respect to the incident angle $\theta$. As is understood from FIG. 10, the angle of the incident light 106 at which the surface plasmon resonance phenomenon is caused is $\theta 1$. When a dielectric thin film 102 having a thickness of d2 smaller than d1 is formed on the metal layer 101, the angle of the incident light 106 at which the surface plasmon resonance phenomenon is caused is $\theta 2$, and in this case, the characteristic curve of the reflectance is represented by a broken line in FIG. 10. In this way, the characteristic curve of the reflectance with respect to the incident angle $\theta$ in a portion where the dielectric thin film 102 is formed is different from that in a portion where the dielectric thin film 102 is not formed. If the surface of a recording and reproducing medium is scanned under the condition that the incident angle $\theta$ is fixed at $\theta 1$, the amount of reflected light in a portion where the dielectric thin film 102 is formed is different from that in a portion where the dielectric thin film 102 is not formed, whereby a reproduced signal A can be obtained.

On the other hand, during the recording, a laser beam is directly irradiated to the dielectric thin film 102 and the dielectric thin film 102 is melted or sublimed with the heat generated at a beam spot to form a pit therein. The dielectric thin film 102 can be formed of en organic monomolecular film or a layered structure including 8 plurality of films.

However, in the above-mentioned structure, recording data is performed by melting or subliming selected portions of the dielectric thin film 102, so that recording new data cannot be repeatedly performed. In addition, separate light sources are required, respectively for recording and reproducing. Moreover, it is difficult to improve the recording density, because the recording density is determined by the spot size of a laser beam.

SUMMARY OF THE INVENTION

The recording and reproducing medium of the present invention, includes:

at least one recording and reproducing layer; and a heating layer which receives light for writing data, converts a part of energy of the light into heat, and selectively heats a desired portion of the recording and reproducing layer, thereby changing optical characteristics of the desired portion, wherein the heating layer converts a part of energy of the light into heat by a surface plasmon resonance phenomenon.

In one embodiment of the present invention, the recording and reproducing layer is made of a phase-transition type material.

In another embodiment of the present invention, the recording and reproducing layer is made of a magneto-optic material.

In still another embodiment of the present invention, the heating layer is made of metal.

In still another embodiment of the present invention, the above-mentioned medium further includes a substrate supporting the recording and reproducing layer and the heating layer.

In still another embodiment of the present invention, the heating layer is separated into a plurality of portions.

In still another embodiment of the present invention, the plurality of portions of the heating layer are arranged in a stripe shape.

In still another embodiment of the present invention, the above-mentioned medium further includes a substrate supporting the recording and reproducing layer and the heating layer, the substrate having a surface on which a plurality of grooves are formed, wherein the plurality of portions of the heating layer are provided in the plurality of grooves.

In still another embodiment of the present invention, each width of the plurality of stripe-shaped portions is smaller than a spot diameter of the light.

In still another embodiment of the present invention, a distance between the respective plurality of stripe-shaped portions is smaller than the spot diameter of the light.

In still another embodiment of the present invention, the plurality of stripe-shaped portions are arranged at a predetermined pitch in a regular manner, and the pitch is smaller than the spot diameter of the light.

In still another embodiment of the present invention, the plurality of portions are arranged in a matrix.

In still another embodiment of the present invention, the above-mentioned medium further includes a substrate supporting the recording and reproducing layer and the heating layer, the substrate having a surface on which a plurality of grooves are formed, wherein the heating layer is formed on the surface of the substrate.

In still another embodiment of the present invention, an upper surface of the heating layer includes at least a first surface region at a first level and a second surface region at a second level which is higher than the first level.

In still another embodiment of the present invention, the upper surface of the heating layer includes a third surface region at a third level which is between the first level and the second level.

In still another embodiment of the present invention, the first surface region and the second surface region are alternately arranged in a first direction, and the first surface region and the third surface region are alternately arranged in a second direction perpendicular to the first direction.

In still another embodiment of the present invention, the first surface region and the second surface region are alternately arranged in a first direction, and the second surface region and the third surface region are alternately arranged in a second direction perpendicular to the first direction.

In still another embodiment of the present invention, a width of at least one of the first surface region and the second surface region is smaller than a spot diameter of the light.

In still another embodiment of the present invention, the first surface region and the second surface region are arranged at a certain pitch in a regular manner, and the pitch is smaller than the spot diameter of the light.

In still another embodiment of the present invention, a difference between the first level and the second level is not more than a wavelength of the light.

According to another aspect of the present invention, an apparatus for recording and reproducing data in a recording and reproducing medium is provided, the medium including:

at least one recording and reproducing layer; and a heating layer which receives light for writing data, converts a part of energy of the light into heat, and selectively heats a desired portion of the recording and reproducing layer, thereby changing optical characteristics of the desired portion, wherein the device includes: a recording light irradiation unit for irradiating the light to the heating layer under the condition that a surface plasmon resonance phenomenon is caused on the heating layer; and a reproducing light irradiation unit for irradiating light for detecting a change of optical characteristics of the desired portion to the recording and reproducing layer.

In one embodiment of the present invention, the recording light irradiation unit irradiates an evanescent light to the heating layer as a recording light.

In another embodiment of the present invention, the reproducing light irradiation unit irradiates an evanescent light to the recording and reproducing layer as a reproducing light.

In still another embodiment of the present invention, the reproducing light irradiation unit detects the change of the optical characteristics of the desired portion by using the surface plasmon resonance phenomenon caused by the evanescent light.

In still another embodiment of the present invention, the reproducing light irradiation means includes a detector for detecting the change of the optical characteristics of the desired portion, the detector detecting P-polarized component and S-polarized component of the reproducing light.

Thus, the invention described herein makes possible the advantages of (1) providing a recording and reproducing medium capable of repeatedly recording and reproducing data, and recording end reproducing data smaller than the spot size of a laser beam, and (2) providing a recording and reproducing apparatus using the same.

These and other advantages of the present invention will become apparent to those skilled in the art upon reading and understanding the following detailed description with reference to the accompanying figures.

BRIEF DESCRIPTION OF THE DRAWINGS

FIG. 1 shows a recording and reproducing medium according to the present invention.

FIG. 2A shows an example of the recording and reproducing medium according to the present invention.

FIG. 2B shows another example of the recording and reproducing medium according to the present invention.

FIG. 3A shows still another example of the recording and reproducing medium according to the present invention.

FIG. 3B shows still another example of the recording and reproducing medium according to the present invention.

FIGS. 3C and 3D are partial cross-section views taken along lines A–A' and B–B', respectively, of FIG. 3B according to the invention.

FIG. 4 shows still another example of the recording and reproducing medium according to the present invention.

FIG. 5 schematically shows a recording and reproducing apparatus which records and reproduces data in the medium according to the present invention.

FIG. 6 is a graph showing the relationship between the reflectance of incident light and the incident angle thereof in the recording and reproducing medium according to the present invention.

FIG. 7 shows the principle of recording in an example of the recording and reproducing medium according to the present invention.

FIG. 8 shows the principle of recording in another example of the recording and reproducing medium according to the present invention.

FIG. 9 shows the principle of a recording and reproducing apparatus which records and reproduces data in the conventional recording and reproducing medium.

FIG. 10 is a graph showing the relationship between the reflectance of incident light and the incident angle thereof in the conventional recording and reproducing medium.

DESCRIPTION OF THE PREFERRED EMBODIMENTS

Hereinafter, the present invention will be described by way of illustrative examples with reference to the drawings.

FIG. 1 shows a recording and reproducing medium 7 in a card shape according to the present invention. The reference numerals 1, 3, and 5 denote a substrate, a heating layer, and a recording and reproducing layer, respectively. On the substrate 1, the heating layer 3 (thickness: 100 nm) made of a metal film such as Au is provided. On the heating layer 3, the recording and reproducing layer 5 (thickness: 40 nm) is provided. The recording and reproducing layer 5 can be made of e phase-transition type material whose refractive index is different depending on states such as a crystalline state and an amorphous state. Alternatively, the recording and reproducing layer 5 can be made of a material having a magneto-optic effect.

FIG. 1 shows the recording and reproducing medium 7 on one side of which recording and reproducing are performed. However, the recording and reproducing medium 7 can be made so that recording and reproducing are performed on both sides thereof. In addition, the recording and reproducing medium 7 can be in a disk shape instead of a card shape.

FIG. 2a shows an example of the recording and reproducing medium 7 of the present invention. The heating layers (thickness: 100 nm) 3 are provided so as to fill grooves (depth: 400 nm, width: 500 nm) 9 formed on the substrate 1. The recording and reproducing layer (thickness: 40 nm) 5 is provided so as to cover the substrate 1 and the heating layers 3. It is desired that the depth of the grooves 9 is equal to or less than a wavelength (typically 100 to 400 nm) of incident light used for recording and reproducing data.

FIG. 2B shows another example of the recording and reproducing medium 7 of the present invention. In this example, a plurality of recessed portions 10 are formed in a matrix on the substrate 1. For example, the size of each recessed portion 10 is 500 nm×500 nm. Because of this structure, the recording position of each data can be restricted to each recessed portion 10. Thus, it becomes easy to discriminate data when the data is recorded and reproduced; as a result, the data can be recorded and reproduced with good reliability.

FIG. 3A shows another example of the recording and reproducing medium 7 of the present invention. In the same way as in FIG. 2A, the grooves 9 are formed on the substrate 1. The heating layer 3 is made of a metal layer and formed by a sputtering method, etc. It is desired that the thickness of the heating layer 3 is set so that second groove 11 is formed in each of the grooves 9.

In this example, after the continuous heating layer 3 is formed over the grooved substrate 1, the recording and reproducing layer 5 is formed on the heating layer 3. The upper surface of the heating layer 3 has first surface regions 14 (concave regions) and second surface regions 16 (convex regions). The data can be selectively recorded on the first surface regions 14 or on the second surface regions 16.

FIG. 3B shows another example of the recording and reproducing medium 7 of the present invention. In this example, each first surface region 14 has mounted portions 12 as preformat pits. The level of the mounted portion 12 is higher than the first surface region 14 and lower than the second surface region 16. In this example, erasable data is repeatedly recorded and reproduced on the first surface regions 14 or on the second surface regions 16, based on the change in characteristics of the recording and reproducing layer 5. The erasure of data such as track number, signal position detecting data, etc. will damage the operation of the apparatus. In this example, such data is pre-recorded by arranging the position of the mounted portions 12. The data based on the mounted portions 12 will not be erased, improving the reliability of the operation of the apparatus. In FIG. 3B, each mounted portion 12 is provided on each first surface region 14. Alternatively, a concave portion can be provided on each second surface region 16 instead of forming the mounted portion 12 on each first surface region 14. In addition, each mounted portion 12 can be provided in a zigzag manner, instead of in a straight manner as shown in FIG. 3B.

FIG. 4 shows another example of the recording and reproducing medium 7 of the present invention. The substrate 1 is flat and the heating layer 3 is formed thereon. The grooves 9 are formed in the heating layer 3 by a semiconductor fabrication technique (e.g., lithography and etching technique), and the recording and reproducing layer 5 is formed thereon.

FIG. 5 shows the principle of a recording and reproducing apparatus which records and reproduces data in the recording and reproducing mediums as shown in FIGS. 1, 2A, 2B, 3A, 3B, and 4.

The medium 4 and the recording and reproducing layer 5 are filled between the prism 13 and the heating layer 3. The medium 4 has a refractive index ns smaller than a refractive index np of the prism 13, and the total thickness of the medium 4 and the recording and reproducing layer 5 is d1. Here, the recording and reproducing layer 5 is made of a phase-transition type material having a thickness of d2 (smaller than d1) and a refractive index nt.

In general, the medium 4 and the recording and reproducing layer 5 should satisfy np>ns and nt>ns, respectively. The medium 4 is generally air (in this case, ns is about 1). As an incident light 15, a P-polarized light having a wavelength of $\lambda$ is incident upon the prism 13 at an angle $\theta$ larger than a critical angle $\theta c$. The reference numeral 20 denotes a lens for condensing the incident light 15 at a bottom face 18 of the prism 13. When the incident light 15 having a particular incident angle $\theta 1$ is incident upon the prism 13, an evanescent wave generated under the interface (i.e., the bottom face 18) ks resonated with the vibration of plasma present between the recording and reproducing layer 5 and the heating layer 3 to cause a surface plasmon resonance phenomenon. Because of this, the reflectance of the incident light 15 is reduced. In the case where ns, np, and nt are determined, main parameters for causing the surface plasmon resonance phenomenon at the highest efficiency are the angle $\theta$ of the incident light 15, the wavelength length $\lambda$ thereof, and the thickness d1.

FIG. 6 is a graph showing the relationship between the reflectance of the incident light 15 and the incident angle $\theta$ thereof, where $\theta$ is a variable. In general, it is desired that the thickness d1 is smaller than the wavelength $\lambda$ of the incident light 15. The refractive index nt of the recording and reproducing layer 5 made of a phase-transition type material is locally different depending on portions thereof. That is to say, the refractive index nt in a portion 19 where data is to be recorded is different from that in a portion 17 where data is not to be recorded. In FIG. 6, the change of the reflectance of the incident light 15 with respect to the incident angle $\theta$ in the portion 17 is represented by a solid line and the change of the reflectance in the portion 19 is represented by a broken line. As is understood from FIG. 6, in the portion 17, the angle of the incident light 15 at which the surface plasmon resonance phenomenon is caused is $\theta 1$. In the portion 19, the angle of the incident light 15 at which the surface plasmon resonance phenomenon is caused is $\theta 2$. In this way, the reflectance of the incident light 15 with respect to the incident angle θ in the portion 19 is different from that in the portion 17. When the surface of the recording and reproducing medium is scanned under the condition that the incident angle θ is set at θ1, the amount of reflected light is varied depending upon the portions of the recording and reproducing layer 5, whereby a reproduced signal a can be detected.

In the case where data is recorded in the above-mentioned recording and reproducing medium, the surface plasmon resonance phenomenon is also used. When the surface plasmon resonance phenomenon is caused, the reflectance of the incident light 15 becomes close to 0. Because of this, as shown in FIG. 7, the optical wave is coupled with the vibration of plasma generated on the surface of the heating layer 3, and part of the optical wave is converted into heat in the heating layer 3. The recording and reproducing layer 5 is heated by the heat generated in the heating layer 3, whereby thermal recording 15 performed.

Thus, the recording of data is performed by setting the incident angle θ1 so that the surface plasmon resonance phenomenon is caused at the portion 17 and by setting the amount of the incident light 15 so that the temperature of the recording and reproducing layer 5 is sufficiently raised by the heat generated in the heating layer 3.

The data recorded in the recording and reproducing layer 5 is erased by another optical system having the structure similar to that described above. If the incident angle of the incident light 15 is θ2, the data can be erased in the same process as that during the recording.

In addition, a higher recording density can be obtained as follows: As shown in FIGS. 3A, 3B, and 4, unevenness is provided on the surface of the heating layer 3, the surface plasmon resonance phenomenon is caused only at concave regions or only at convex regions of the heating layer 3. Alternatively, as shown in FIGS. 2A and 2B, the surface plasmon resonance phenomenon is selectively caused at portions where the heating layers 3 are filled. The surface plasmon resonance phenomenon is sensitive to the incident angle θ of the incident light 15 and to the thickness d1. Thus, as shown in FIG. 8, in the case where the convex regions are formed so that the thickness between the bottom surface of the prism 13 end each top surface of the convex regions is d1, the surface plasmon resonance phenomenon is generated only at the convex regions to heat the heating layer 3, but heat is not generated in the concave regions. On the other hand, in the case where the concave regions are formed so that the thickness between the bottom surface of the prism 13 and each bottom surface of the concave regions is d1, the surface plesmon resonance phenomenon is generated only at the concave regions to heat the heating layer 3, but heat is not generated in the convex regions.

Due to the above-mentioned characteristics, the following is possible:

For example, when a width T of each concave region or each convex region is set to be equal to or less than a beam spot diameter φD, only the convex regions or only the concave regions are selectively heated. Therefore, data which is smaller than the beam spot diameter can be recorded and reproduced.

In the case where the recording end reproducing layer 5 is made of a magneto-optic material, the principle of the recording is the same. That is, the heating layer 3 is heated due to the surface plasmon resonance phenomenon, whereby thermal recording is performed in the recording and reproducing layer 5. In the case where the recording and reproducing layer 5 is made of a magneto-optic material, when the temperature of the recording end reproducing layer 5 exceeds a Curie temperature, the magnetic field in an adequate direction is applied, in response to the contents of data, to the recording and reproducing layer 5, whereby data is recorded. In this case, the refractive index of the recording and reproducing layer 5 is hardly changed by recording data. Thus, the amount of change in the intensity of the reproducing light as reflected is remarkably decreased. However, the reproduced signal can be obtained by detecting the change of an S-polarized component and a P-polarized component of the reflected light. This detection can be performed by a detection optical system of a conventional magneto-optic recording apparatus.

In this recording and reproducing medium, the recorded data can be erased by the same optical system as that used for recording. However, a bias magnetic circuit for inverting the direction of the magnetization of recorded data is required.

In the examples of the present invention, the thickness of the heating layer 3 can be several μm, as long as the thickness is sufficiently larger than the depth of penetration of incident light for recording and reproducing data. The heating layer 3 can be made of a metal material which efficiently causes a surface plasmon resonance phenomenon and which is thermally stable. Examples of the metal material include Au, Pt, etc. The thickness of the recording and reproducing layer 5 is desirably 1000 Å or less. In addition, the thickness d1 shown in FIG. 5 is preferably equal to or less than a wavelength of the incident light 15. It is more preferred that the thickness d1 is as small as possible. For example, assuming that the incident light 15 is an He-Ne laser beam, the wavelength thereof is about 0.63 μm. In this case, it is preferred that the thickness d1 is 0.1 μm or less.

As described above, according to the present invention, because of the surface plasmon resonance phenomenon, light energy can be efficiently converted into heat energy. The efficiency can be set at 90% or more under ideal conditions. This shows that according to the present invention, an efficiency twice that of the conventional system can be obtained. Moreover, because of the unevenness of the surface of the recording and reproducing medium and the pattern formation on the heating layer, the local surface plasmon resonance phenomenon can be selectively caused. Thus, data is recorded and reproduced at a wavelength or less of the incident light.

Various other modifications will be apparent to and can he readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A recording and reproducing medium comprising:

at least one recording and reproducing layer; and a heating layer which receives light for writing data, converts a part of energy of the light into heat, and selectively heats a desired portion of the recording and reproducing layer, thereby changing optical characteristics of the desired portion, wherein the heating layer is a metal material which is separated into a plurality of portions, as part of a generally planar surface, for converting the part of energy of the light into the heat by a surface plasmon resonance phenomenon to change the optical characteristics of the desired portion of the recording and reproducing layer, and the heating layer has a thickness which is larger than the depth of penetration of incident light for recording and reproducing data.

2. A recording and reproducing medium according to claim 1, wherein the recording and reproducing layer is made of a phase-transition material.

3. A recording and reproducing medium according to claim 1, wherein the recording and reproducing layer is made of a magneto-optic material.

4. A recording and reproducing medium according to claim 1, wherein the metal material is Au or Pt.

5. A recording and reproducing medium according to claim 1, further comprising a substrate supporting recording and reproducing layer and the heating layer.

6. A recording and reproducing medium according to claim 1, wherein each portion of the plurality of portions of the heating layer is a stripe shape.

7. A recording and reproducing medium according to claim 6, further comprising a substrate supporting the recording and reproducing layer and the heating layer, the substrate having a surface on which a plurality of grooves are formed, wherein the plurality of portions of the heating layer are provided in the plurality of grooves.

8. A recording and reproducing medium according to claim 6, wherein the light has a predefined Spot diameter and each width of the plurality of stripe-shaped portions is smaller than the spot diameter of the light.

9. A recording and reproducing medium according to claim 6, wherein the light has a predefined spot diameter and a distance between the respective plurality of stripe-shaped portions is smaller than the spot diameter of the light.

10. A recording and reproducing medium according to claim 6, wherein the light has a predefined spot diameter, the plurality of stripe-shaped portions are arranged at a predetermined pitch in a regular manner, and the pitch is smaller than the spot diameter of the light.

11. A recording and reproducing medium according to claim 1, wherein the plurality of portions are arranged in a matrix.

12. A recording and reproducing medium according to claim 1, further comprising a substrate supporting the recording and reproducing layer and the heating layer, the substrate having a surface on which a plurality of grooves are formed, wherein the heating layer is formed on the surface of the substrate.

13. A recording and reproducing medium according to claim 1, wherein the recording and reproducing layer is a continuous layer.

14. A recording and reproducing medium comprising:

at least one recording and reproducing layer; and a heating layer for receiving light for writing data, converting a part of energy of the light into heat, and selectively heating a desired portion of the recording and reproducing layer thereby changing optical characteristics of the desired portion, wherein the heating layer is a metal material for converting the part of energy into heat by a surface plasmon resonance phenomenon and wherein an upper surface of the heating layer includes at least a first surface region at a first level, a second surface region at a second level which is higher than the first level, and a third surface region at a third level which is between the first level and the second level, the surface regions at the first, second, and third levels occupying respective substantially parallel planes.

15. A recording and reproducing medium according to claim 14, wherein the first surface region and the second surface region are alternately arranged in first direction, and the first surface region and the third surface region are alternately arranged in second direction perpendicular to the first direction.

16. A recording and reproducing medium according to claim 14, wherein the first surface region and the second surface region are alternately arranged in a first direction, and the second surface region and the third surface region are alternately arranged in a second direction perpendicular to the first direction.

17. A recording and reproducing medium according to claim 14, wherein the light has a predefined spot diameter, and a width of at least one of the first surface region and the second surface region is smaller than the spot diameter of the light.

18. A recording and reproducing medium according to claim 17, wherein the light has a predefined spot diameter, the first surface region and the second surface region are arranged at a certain pitch in a regular manner, and the pitch is smaller than the spot diameter of the light.

19. A recording and reproducing medium according to claim 14, wherein the light has a predefined wavelength and a difference between the first level and the second level is not more than the wavelength of the light.

20. A recording and reproducing medium according to claim 14, wherein the recording and reproducing layer is a continuous layer.

21. A recording and reproducing medium according to claim 14, wherein the metal material is Au or Pt.

22. A recording and reproducing medium according to claim 14, wherein the heating layer has a thickness which is larger than the depth of penetration of incident light for recording and reproducing data.

23. A recording and reproducing medium according to claim 14, wherein the heating layer is a continuous layer.

* * * * *

UNITED STATES PATENT AND TRADEMARK OFFICE
CERTIFICATE OF CORRECTION

PATENT NO.: 5,582,896

DATED: December 10, 1996

INVENTOR(S): Makoto Kuwamoto et al.

It is certified that error appears in the above-identified patent and that said Letters Patent is hereby corrected as shown below:

In column 2, line 17, "en" should read --an--; line 18, "8" should read --a--.
In column 4, line 14, "end" should read --and--.
In column 6, line 39, "ks" should read --is--.
In column 7, line 6, the second "a" should read --A--; line 18, "15" should read --is--; line 42, "end" should read --and--; line 61, "end" should read --and--.
In column 8, line 1, "end" should read --and--.

Claim 5, line 2, --the-- should be inserted after "supporting"; and
Claim 8, line 2,, "Spot" should read --spot--.

Signed and Sealed this

Twenty-first Day of October 1997

Attest:

BRUCE LEHMAN

Attesting Officer

Commissioner of Patents and Trademarks